(12) United States Patent
Li et al.

(10) Patent No.: US 7,060,362 B2
(45) Date of Patent: *Jun. 13, 2006

(54) LABELS AND LABELING PROCESS

(75) Inventors: Xing-Ya Li, San Gabriel, CA (US); Kai Li, Diamond Bar, CA (US); Frank Y. Shih, Arcadia, CA (US); James A. Macuga, Concord, OH (US); Thomas E. Selleny, Concord, OH (US)

(73) Assignee: Avery Dennison Corporation, Pasadena, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/713,953

(22) Filed: Nov. 14, 2003

(65) Prior Publication Data

US 2004/0109997 A1 Jun. 10, 2004

Related U.S. Application Data (62) Division of application No. 10/225,007, filed on Aug. 21, 2002, now Pat. No. 6,761,969.

(51) Int. Cl.
*B32B 7/12* (2006.01)

(52) U.S. Cl. ............... 428/457; 428/458; 428/461; 428/304.4; 428/315.9; 428/317.3; 428/350; 428/354; 428/317.7; 427/207.1

(58) Field of Classification Search ............... 428/457, 428/458, 461, 304.4, 317.3, 350, 354, 317.7, 428/315.9; 427/207.1
See application file for complete search history.

(56) References Cited

U.S. PATENT DOCUMENTS

| | | | |
|---|---|---|---|
| 4,460,637 A | 7/1984 | Miyamoto et al. | 428/212 |
| 5,104,730 A | 4/1992 | Misuda et al. | 428/304.4 |
| 5,264,275 A | 11/1993 | Misuda et al. | 428/304.4 |
| 5,275,867 A | 1/1994 | Misuda et al. | 428/195 |
| 5,326,625 A | 7/1994 | Schuhmann et al. | 428/215 |
| 5,463,178 A | 10/1995 | Suzuki et al. | 428/216 |
| 5,523,149 A | 6/1996 | Kijimuta et al. | 428/307.3 |
| 5,624,482 A | 4/1997 | Kijimuta et al. | 100/31.37 |
| 5,670,249 A | 9/1997 | Tanuma | 428/304.4 |
| 5,686,161 A | 11/1997 | Cullen et al. | 428/68 |
| 5,709,937 A | 1/1998 | Adams et al. | 428/332 |
| 5,928,127 A | 7/1999 | Tanuma | 516/93 |
| 6,022,612 A * | 2/2000 | Wilkie | 428/215 |
| 6,037,050 A | 3/2000 | Saito et al. | 428/304.4 |
| 6,093,483 A | 7/2000 | Tanuma | 428/304.4 |
| 6,117,537 A | 9/2000 | Butters et al. | 428/304.4 |
| 6,153,288 A | 11/2000 | Shih et al. | 428/195 |
| 6,165,606 A | 12/2000 | Kasahara et al. | 428/323 |
| 6,166,122 A | 12/2000 | Tanuma et al. | 524/430 |
| 6,217,166 B1 | 4/2001 | Saito et al. | 347/100 |
| 6,238,784 B1 | 5/2001 | Mochizuki et al. | 428/321.1 |
| 6,306,242 B1 | 10/2001 | Dronzek | 156/308.8 |
| 6,344,262 B1 | 2/2002 | Suzuki | 428/195 |
| 6,761,969 B1 * | 7/2004 | Li et al. | 428/354 |
| 2001/0035265 A1 | 11/2001 | Dronzek | 156/327 |
| 2001/0036542 A1 | 11/2001 | Marks | 428/212 |

* cited by examiner

Primary Examiner—Daniel Zirker
(74) Attorney, Agent, or Firm—Renner, Otto, Boisselle & Sklar, LLP

(57) ABSTRACT

This invention relates to labels. In one embodiment, the labels comprise a polymer facestock layer, a nano-porous layer underlying the facestock, and a metal layer overlying the facestock or underlying the facestock between the facestock and the nano-porous layer. In another embodiment, the labels also comprise a water-based adhesive in contact with the lower surface of the nano-porous layer. These labels can be bonded to substrates of glass, plastic, or metal using a water based adhesive which is in contact with the nano-porous layer.

33 Claims, 1 Drawing Sheet

LABELS AND LABELING PROCESS

CROSS REFERENCE TO RELATED APPLICATION

This application is a division of application Ser. No. 10/225,007 filed Aug. 21, 2002 now U.S. Pat. No. 6,761,969.

TECHNICAL FIELD OF THE INVENTION

This invention relates to labels, and more particularly to polymeric film labels, and to a process of applying polymeric film labels to containers using a water-based adhesive.

BACKGROUND OF THE INVENTION

It is common practice to apply labels to containers or bottles formed from polymers or glass. Such containers and bottles are available in a wide variety of shapes and sizes for holding many different types of materials such as detergents, chemicals, motor oil, soft drinks, alcoholic beverages, etc. The labels provide information containing the contents of the container and other information such as the supplier of the container or the contents of the container.

One widely used and well known labeling technique uses a water-based adhesive, and this technique is commonly known as water-based "cold glue labeling" or "patch labeling". In such labeling method, a water-based adhesive is applied to the label, which is usually held in a stack in a magazine, the label is then transferred to a transfer means, and the label is subsequently applied to the relevant container. The use of water-based adhesives requires that drying must take place by evaporation of the water. Accordingly, the early practice in this technology, which is still prevalent today, employed the use of labels manufactured from paper substrates which have a high vapor transmission rate "WVTR" so that drying of the adhesive after the label is applied to the container is not hindered. With paper labels, drying takes place in a few hours after application of the label to the container. The use of paper in conjunction with water-based adhesives, while providing for a quick drying label, results in other problems known in the industry such as poor tear resistance, moisture sensitivity, relatively poor durability, wrinkling, creasing, etc. Furthermore, it is becoming more common to recycle plastic and glass containers, and if a paper label has been utilized, it is not possible to recycle the container without removing the label prior to recycling.

Polymeric film materials and film facestocks have been described for use as labels in various fields, but their use in the labeling applications of the type discussed above in which a water-based adhesive is utilized has been limited because with polymeric films which are essentially non-permeable to water, it is very difficult for the moisture vapors to escape which is necessary for an accelerated drying process. The slow drying of the water-based adhesive when polymer films and facestocks are utilized in the labels also increases the time necessary to obtain a satisfactory bond of the label to the container. This often results in label movement during handling and storage, and visible bubbling effects at the surface of the label which are aesthetically undesirable. Bubbling has been observed to occur in particular at elevated temperatures such as exists in the summer.

Clear polymeric labels are increasingly desired, since they provide a no-label look to decorated glass and plastic containers. Paper labels block the visibility of the container and/or the contents in the container. Clear labels enhance the visual aesthetics of the container, and therefore the product, and are growing much faster than paper labels in the package decoration market as consumer product companies are continuously trying to upgrade the appearance of their products on store shelves.

Accordingly, it would be desirable to produce labels, in particular, polymeric film labels which can be applied to containers using a water-based adhesive wherein the adhesive dries and the label bonds to the container within an acceptable period of time.

SUMMARY OF THE EMBODIMENTS

In one embodiment, this invention relates to a label which comprises:
(A) a polymer facestock having an upper surface and a lower surface,
(B) a nano-porous layer having an upper surface and a lower surface wherein the upper surface of the nano-porous layer underlies the facestock, and the nano-porous layer contains pores having an average diameter of from about 1 to about 100 nm and the layer has a pore volume of from about 0.1 to about 2 ml./g., and
(C) a water-based adhesive in contact with the lower surface of the nano-porous layer.

In another embodiment, this invention relates to a label which comprises:
(A) a polymer facestock having an upper surface and a lower surface,
(B) a nano-porous layer having an upper surface and a lower surface wherein the upper surface of the nano-porous layer underlies the facestock, and the nano-porous layer contains pores having an average diameter of from about 1 to about 100 nm and has a pore volume of from about 0.1 to about 2 ml./g., and
(C) a metal layer overlying the upper surface of the facestock or underlying the facestock between the facestock and the nano-porous layer, said metal layer having an upper surface and a lower surface.

In addition, the present invention relates to a method of labeling substrates utilizing the above described labels and water-based adhesives.

DESCRIPTION OF THE INVENTION

The term "overlies" and cognate terms such as overlying and the like, when referring to the relationship of one or a first layer relative to another or a second layer, refers to the fact that the first layer partially or completely overlies the second layer. The first layer overlying the second layer may or may not be in contact with the second layer. For example, one or more additional layers may be positioned between the first and the second layer. The term "underlies" and cognate terms such as "underlying" and the like have similar meanings except that the first layer partially or completely lies under, rather than over the second layer.

The term "transparent" when referring to one or more layers of the label film means that any material beneath such layers can be seen through such layers. In reference to the use of "transparent" or "clear" labels applied to clear containers, such as beer bottles, the bottle and the beer within the bottle are visible through the label.

The term "clear" when referring to one or more layers of the label or to the label itself means the opacity of the layers or label is less than about 5%, and the layers or the label has a haze of less than about 10%. Opacity is measured in accordance with TAPPI Test T425 os, and haze is measured in accordance with ASTM Test Method D1003.

A label of a first embodiment (hereinafter sometimes referred to as the "first embodiment" or the "label of the first embodiment") comprises:

(A) a polymer facestock having an upper surface and a lower surface,
(B) a nano-porous layer having an upper surface and a lower surface wherein the upper surface of the nano-porous layer underlies the facestock, and the nano-porous layer contains pores having an average diameter of from about 1 to about 100 nm and the layer has a pore volume of from about 0.1 to about 2 ml./g., and
(C) a water-based adhesive in contact with the lower surface of the nano-porous layer.

Figure 1:
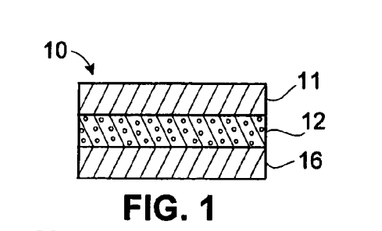
FIGS. 1–11 are cross sections of label constructions of the present invention.

Labels of the first embodiment are illustrated in FIGS. 1–5. In FIG. 1, label 10 comprises a polymer facestock 11 having an upper surface and a lower surface, a nano-porous layer 12 having an upper surface and a lower surface wherein the upper surface of the nano-porous layer 12 is in contact with and adhered to the lower surface of the facestock 11, and an aqueous adhesive 16 which is in contact with the lower surface of the nano-porous layer.

Figure 2:
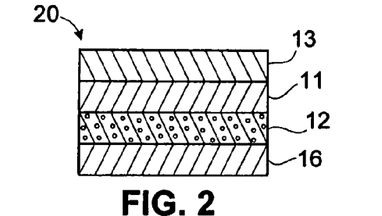
Figure 3:
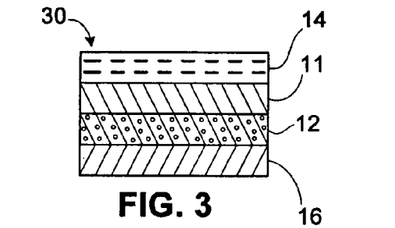

The adhesive labels of the first embodiment of this invention may, and generally do contain other layers. For example, as shown in FIG. 2, the label 20 may contain a metal layer 13 which overlies and is in contact with the facestock layer 11. Alternatively, a print layer 14 can be on the upper surface of the facestock 11 as illustrated in FIG. 3. The adhesive label 30 illustrated in FIG. 3 comprises facestock 11 having an upper surface and a lower surface; a nano-porous layer 12 having an upper surface and a lower surface wherein the upper surface of layer 12 is in contact with the lower surface of the facestock 11; water based adhesive layer 16 which is in contact with the lower surface of the nano-porous layer 12; and a print layer 14 which overlies and is in contact with the upper surface of the facestock 11.

Figure 4:
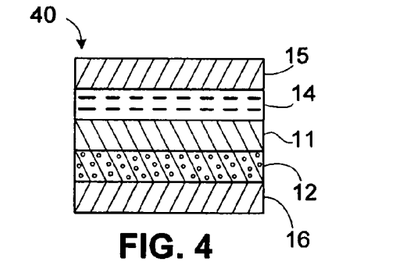

FIG. 4 illustrates label 40 which comprises facestock 11 having an upper surface and a lower surface; a nano-porous layer 12 having an upper surface and a lower surface wherein the upper surface of a nano-porous layer 12 is in contact with the lower surface of the facestock 11; water based adhesive layer 16 which is in contact with the lower surface of the nano-porous layer 12; print layer 14 which overlies and is in contact with the upper surface of the facestock 11; and transparent protective layer 15 which overlies and is in contact with the upper surface of the print layer 14.

Figure 5:
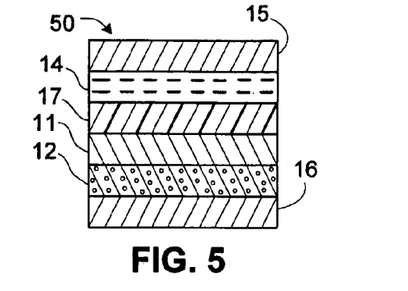

FIG. 5 illustrates label 50 which is similar to the label of FIG. 4 except that the label of FIG. 5 contains an additional antistatic polymer layer 17 between the facestock layer 11 and the print layer 14. The antistatic polymer layer 17 may comprise any of the antistatic protective compositions described below.

The labels illustrated in FIGS. 1–5 may also contain adhesion promoting layers (APLs) between one or more of the layers shown. For example, an APL can be inserted between the facestock 11 and the nano-porous layer 12; between the facestock and the metal layer or print layer; etc.

In a second embodiment (hereinafter sometimes referred to as "the second embodiment" or "the label of the second embodiment", the present invention relates to a label comprising:

(A) a polymer facestock having an upper surface and a lower surface,
(B) a nano-porous layer having an upper surface and a lower surface wherein the upper surface of the nano-porous layer underlies the facestock, and the nano-porous layer contains pores having an average diameter of from about 1 to about 100 nm and the layer has a pore volume of from about 0.1 to about 2 ml./g., and
(C) a metal layer overlying the upper surface of the facestock, said metal layer having an upper surface and a lower surface.

Figure 9:
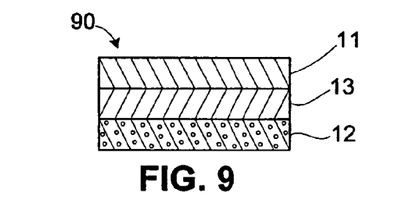
Figure 10:
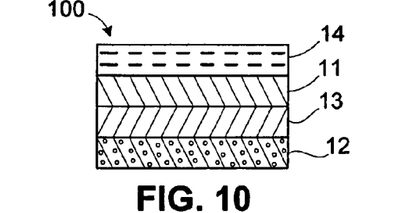
Figure 11:
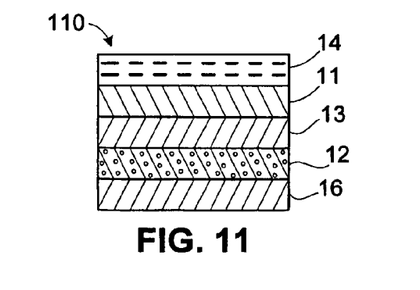

Labels of the third embodiment are illustrated in FIGS. 9–11. In FIG. 9, the label 90 comprises a facestock 11 having an upper surface and a lower surface, a metal layer 13 having an upper surface and a lower surface wherein the upper surface of the metal layer 13 is in contact with and adhered to the lower surface of the facestock layer 11, and a nano-porous layer 12 having an upper surface and a lower surface wherein the upper surface of layer 12 is in contact with and adhered to the lower surface of the metal layer 13. The label 100 of FIG. 10 contains the same layers as in FIG. 9 and an additional layer 14 which is a print layer having an upper surface and a lower surface wherein the lower surface of the print layer 14 is in contact with the upper surface of the facestock layer 11. FIG. 11 illustrates a label 110 like the label 100 of FIG. 10 with an additional layer 16 of a water-based adhesive which is in contact with the lower surface of a nano-porous layer 12. Although not shown in FIGS. 9–11 APLs can be illustrated between one or more of the layers shown in FIGS. 9–11.

The polymer facestock layer may be a monolayer film or a multilayer film. The multilayer film may comprise from two to ten or more layers. The polymer facestock may be oriented or not oriented. Depending on the end use of the label, the polymer facestock may be transparent or opaque. Opaque facestocks generally comprise a polymer as described below and one or more pigments to provide the facestock, or one layer of a multilayer facestock with the desired color. Pigments useful for this purpose are well known in the art. For example, white films can be prepared by introducing titanium dioxide and other white pigments into the polymer. Carbon black may be introduced to provide a black or grey facestock or film.

Figure 6:
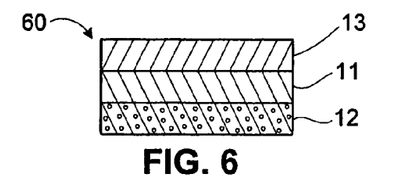
Figure 7:
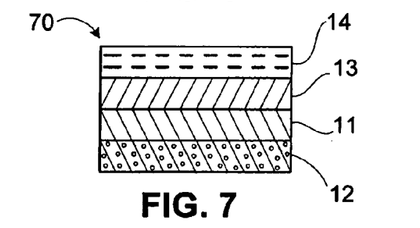
Figure 8:
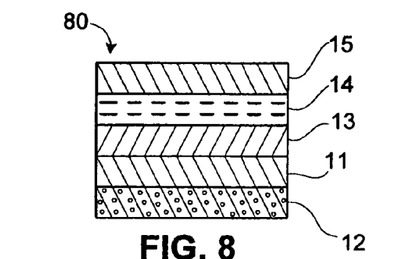

A wide variety of polymer film materials are useful in preparing the facestocks useful in the present invention. For example, the polymer film material may include polymers and copolymers such as at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of Labels of the second embodiment are illustrated in FIGS. 6–8. In FIG. 6, label 60 comprises a facestock 11, having an upper surface and a lower surface, a nano-porous layer 12 having an upper surface and a lower surface wherein the upper surface of layer 12 is in contact with the lower surface of the facestock 11, and a metal layer 13 having an upper surface and a lower surface, wherein the lower surface of the metal layer 13 overlies and is in contact with the upper surface of the facestock 11. The label 70 illustrated in FIG. 7 is similar to the label illustrated in FIG. 6 with the addition of a print layer 14 having an upper surface and a lower surface wherein the lower surface of the print layer 14 is in contact with the upper surface of the metal layer 13. The label 80 illustrated in FIG. 8 is similar to the label illustrated in FIG. 7 with the addition of a transparent protective topcoat or overcoat layer 15 which has an upper surface and a lower surface, and the lower surface of the transparent protective topcoat or overcoat layer 15 is in contact with the upper surface of the print layer 14. Although not shown in FIGS. 6–8, the labels illustrated therein may contain one or more adhesion promoting layers (APLs). For example, an APL can be inserted between the facestock 11 and the metal layer 13; between the facestock 11 and the nano-porous layer 12; and/or between the metal layer 13 and the print layer. When the labels illustrated in FIGS. 6–8 are to be applied to a substrate, a water-based adhesive, described in detail below, is applied to the lower surface of the nano-porous layer 12, generally just prior to application of the label to the substrate.

A third embodiment (hereinafter sometimes referred to as "the third embodiment" or "the label of the third embodiment") comprises:

(A) a polymer facestock having an upper surface and a lower surface, (B) a nano-porous layer having an upper surface and a lower surface wherein the upper surface of the nano-porous layer underlies the facestock, and the nano-porous layer contains pores having an average diameter of from about 1 to about 100 nm and has a pore volume of from about 0.1 to about 2 ml./g., and (C) a metal layer underlying the facestock between the facestock and the nano-porous layer, said metal layer having an upper surface and a lower surface. ethylene methacrylic acid, cellulosics, polyacrylonitrile, alkylene-vinyl acetate copolymer, or mixtures of two or more thereof.

The polyolefins which can be utilized as the polymer film material include polymers and copolymers of olefin monomers containing 2 to about 12 carbon atoms such as ethylene, propylene, 1-butene, etc., or blends of mixtures of such polymers and copolymers. In one embodiment the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content. Useful propylene homopolymers and copolymers are described in U.S. Pat. No. 5,709,937 (Adams et al). The copolymers include propylene-ethylene copolymers containing up to about 10% by weight of ethylene, and propylene-1-butene copolymers containing up to about 15% by weight of 1-butene. Oriented films described in the '937 patent are clear films useful as the facestock in the labels of the present invention. The disclosure of U.S. Pat. No. 5,709,937 is hereby incorporated by reference.

Various polyethylenes can be utilized as the polymer film material including low, medium, and high density polyethylenes, and mixtures thereof. An example of a useful low density polyethylene (LDPE) is Rexene 1017 available from Huntsman. An example of a useful high density polyethylene (HDPE) is Formoline LH5206 available from Formosa Plastics. In one embodiment the polymer film material comprises a blend of 80 to 90% HDPE and 10–20% of LDPE.

The propylene homopolymers which can be utilized as the polymer film material in the invention, either alone, or in combination with a propylene copolymer as described herein, include a variety of propylene homopolymers such as those having melt flow rates (MFR) from about 0.5 to about 20 as determined by ASTM Test D 1238. In one embodiment, propylene homopolymers having MFR's of less than 10, and more often from about 4 to about 10 are particularly useful. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Dow Chemical and having a melt flow of 12.0 g/10 min and a density of 0.90 g/cm$^3$; DX5E66, also available from Dow Chemical and having an MFI of 8.8 g/10 min and a density of 0.90 g/cm$^3$; and WRD5-1057 from Dow Chemical having an MFI of 3.9 g/10 min and a density of 0.90 g/cm$^3$. Useful commercial propylene homopolymers are also available from Fina and Montel.

Examples of useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, International Paper of Wayne, N.J. under the Uni-Rez product line, and dimer-based polyamide resins available from Bostik, International Paper, Fuller, Henkel (under the Versamid product line). Other suitable polyamides include those produced by condensing dimerized vegetable acids with hexamethylene diamine. Examples of polyamides available from International Paper include Uni-Rez 2665; Uni-Rez 2620; Uni-Rez 2623; and Uni-Rez 2695.

Polystyrenes can also be utilized as the polymer facestock material and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymer film material, and the polyurethanes may include aliphatic as well as aromatic polyurethanes.

The polyurethanes are typically the reaction products of (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, and Sancure 12471® (all of which are commercially available from Noveon, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia), and NeoRez R-960 (Avecia).

Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the facestocks comprises at least one polyester polyurethane. Examples of these urethanes include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company Avecia, and the acrylic copolymer dispersion sold under the name "Neocryl XK-90" by the company Avecia.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid, etc. Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G. E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In one embodiment, the facestock polymer material may comprise fluorinated polymer. The fluorinated polymer includes a thermoplastic fluorocarbon such as polyvinylidene fluoride (PVDF). The fluorinated polymer also can include copolymers and terpolymers of vinylidene fluoride. A useful thermoplastic fluorocarbon is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The polymer facestock material may be free of inorganic fillers and/or pigments for clear facestocks and clear labels, or the polymer facestock material may be cavitated and/or contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, anti-blocking agents, processing aids, acid acceptors, etc. Opaque and/or white facestocks are often utilized when the labels described herein do not contain a metal layer overlying the facestock layer.

The polymer facestock material is chosen to provide a continuous polymer film in the film structures of this invention with the desired properties such as improved tensile strength, elongation, impact strength, tear resistance, and optics (haze and gloss). The choice of polymeric facestock forming material also is determined by its physical properties such as melt viscosity, high speed tensile strength, percent elongation etc. In one embodiment, clear or transparent facestocks are used in the label construction when clear or transparent labels are desired.

The thickness of the polymer facestock is from about 0.1 to about 10 mils, or from about 1 to about 5 mils. In one embodiment the thickness of the facestock is from about 1 to about 3 mils. The facestock may comprise a single layer, or the film can be a multilayer film of two or more adjacent layers. For example the film can comprise one layer of a polyolefin and one layer of a blend of a polyolefin and a copolymer of ethylene and vinyl acetate (EVA). In another embodiment the film comprises three layers, a base or core layer of, for example, a polyolefin, and skin layers in both sides of the base or core layer which may be comprised of the same or different polymer blends. The individual layers of a multilayer facestock may be selected to provide desirable properties.

The monolayer and multilayer film facestocks useful in the labels useful herein can be manufactured by those processes known to those skilled in the art such as by casting or extrusion. In one embodiment, the films are manufactured by polymer extrusion or coextrusion processes. The extrudate or coextrudate of polymeric film materials is formed by simultaneous extrusion from a suitable known type of extrusion or co-extrusion die, and in the case of a coextrudate, the layers are adhered to each other in a permanently combined state to provide a unitary coextrudate.

In addition to coextrusion, the multilayer film facestocks useful in the present invention may be prepared by extrusion of a continuous film to form one layer followed by the application of one or more additional layers on the extruded layer by extrusion of one or more additional layers; by lamination of a preformed polymer film to a preformed functional film; or by deposition of additional layers on the preformed film from an emulsion or solution of a polymeric film forming material.

In one embodiment, the facestocks used in the present invention are not oriented. That is, the facestock and films are not subjected to a hot-stretching and annealing step. In other embodiments, the facestock contained in the labels used in the present invention may be oriented in the machine direction (uniaxially) or in both the machine and cross directions (biaxially) by hot-stretching and annealing by techniques well known to those skilled in the art. For example, the films may be hot-stretched in the machine direction only at a ratio of at least 2:1 and more often, at a ratio of between about 2:1 to about 9:1. After the film has been hot stretched, it is generally passed over annealing rolls where the film is annealed or heat-set at temperatures in the range of from about 50° C., more often 100° C. to about 150° C., followed by cooling. In another embodiment, the facestock is a biaxially oriented.

It is desirable that the films exhibit a degree of stiffness in the machine direction and the cross direction to facilitate handling, printing and dispensing. Thus, in one embodiment, the stiffness in the machine direction, and the cross direction should be at least about 14 Gurley (mg), as determined using TAPPI Test T543 pm and in a further embodiment the Gurley stiffnesses in both directions are within about 5 Gurley units (sometimes referred to as a balanced stiffness).

Polymer facestocks useful in the labels of the present invention are available commercially from a variety of sources such as Avery Dennison Corp., Painesville, Ohio; AMTOPP, a division of Interplast Group LTD, Livingston, N.J. 07039, Exxon Mobil Chemical Co., Macdon, N.Y. 14502; AET Films, New Castle, Del. 19720; and UCB Films Inc., Smyrna, Ga. 30080. Clear films and white films are available.

Specific examples of useful polypropylene facestock films which are commercially available include the following:

| Film Name | Thickness | Type | Gurley Stiffness (mg) | |
|---|---|---|---|---|
| | | | MD | CD |
| Mobil BOPP W/434TC | 2 | Clear | 15 | 18 |
| AMTOPP BOPP | 2 | Clear | 16 | 17 |
| UCB CA-200 BOPP | 2 | Clear | 25 | 28 |
| AET CSL 111-125 C/S | 3.2 | White | 48 | 71 |

The surface energy of both surfaces of the facestock can be enhanced by treatments such as corona discharge, flame, plasma, etc. to provide the surfaces with desirable properties such as improved adhesion to subsequently applied layers. Procedures for corona treating and flame treating of polymer films are well known to those skilled in the art. In one embodiment, a facestock is corona discharge treated on the upper surface and flame treated on the lower surface.

The labels of the present invention also comprise a nano-porous layer 12 (in FIGS. 1–11) having an upper surface and a lower surface wherein the upper surface of the nano-porous layer generally is in contact with and adhered to the lower surface of the facestock 11 or, in some embodiments (e.g., FIGS. 9–11), to the lower surface of the metal layer 13. In other embodiments, primers or adhesion promoting layers may be inserted between the polymer facestock and the upper surface of the nano-porous layer. The nano-porous layers useful in this invention contain pores having an average diameter of from about 1 to about 100 nm, and the layers have a pore volume of from about 0.1 to about 2 ml/g. In other embodiments the pore diameters of the nano-porous layers may range from about 5 to about 80 nm or about 10 to about 50 nm, and the pore volumes may range from about 0.1 to about 1.2 ml/g. In yet another embodiment, the pore volume is about 1 ml/g or less. Such pore sizes and pore volumes provide the nano-porous layers with the desired absorptivity and, when desired, transparency. The presence of the nano-porous layer significantly reduces the time required to dry the polymer film label after it is applied to a substrate. It is believed that the nano-porous layer absorbs water from the water-based adhesive layer thereby causing the viscosity of the adhesive to rise until the adhesive dries and secures the label to the substrate being labeled.

In one embodiment, the nano-porous layers will comprise a binder and nano-sized inorganic particles. The nano-porous layer can be prepared from a mixture of a binder and the nano-sized particles, generally in a diluent or solvent for the binder. The nano-sized inorganic particles mixed with the binder generally will have an average primary particle size of less than about 100 nm. In another embodiment, the average primary particle size may range from about 5 to about 40 nm. For clear nano-porous layers, inorganic particles having an average primary particle diameter of from 8 to about 15 or 20 nm often are used.

The amount of inorganic particles mixed with and incorporated into the binder may vary over a wide range. In one embodiment the mixture will contain at least 60% by weight of the inorganic products based on the weight of the mixture. In other embodiments, the mixture will contain at least 65% or even 70% by weight of the particles. The binder mixtures may contain up to about 85%, 90% or even 95% by weight of the particles. The amount of the inorganic particles included in the mixture will be determined from a consideration of several factors, including type of particle, size of particle, desired clarity of the nano-porous layer, etc.

The thickness of the nano-porous layers utilized in the labels of the invention may range from about 5 to about 100 microns or more. In one embodiment, the thickness is from about 5 to about 40 microns, and in yet another embodiment from about 15 to about 25 microns.

The binder which may be utilized in the nano-porous layer may be any film forming monomer, oligomer or polymer or combinations thereof. The binders may be water soluble, organic solvent soluble, or insoluble in water and organic solvents since the coating compositions may be applied as solutions, dispersions or emulsions. Non-limiting examples of useful binders include polyurethanes, polyolefins, polyacryls, polymethacryls, polyamides, polyvinyl acetates, polyvinyl alcohols, polyvinyl ethers, polyacrylonitriles, polystyrenes, polyvinyl pyrrolidones, polyvinyl chlorides, poly (alkylene oxides), proteins, cellulosic polymers, gelatine, and copolymers of one or more monomers including olefins, (meth) acrylates, vinyl acetates, allyl acetates, vinyl chlorides, acrylonitriles, N-vinyl pyrrolidones, N-vinyl oxazolidones, vinyl ethers and other allylic and vinylic monomers.

In one embodiment, the binder is a polyurethane. The polyurethanes are typically the reaction products of the following components: (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers. Aliphatic polyisocyanates include 1,6-hexamethylene diisocyanate (HMDI) and its isocyanurate-containing derivatives; cycloaliphatic polyisocyanates such as 4,4'-methylene bis(cyclohexyl isocyanate), cyclohexane 1,4-diisocyanate and its isocyanurate derivatives; aromatic polyisocyanates such as 4,4'-diphenylmethane diisocyanate (MDI), xylyene diisocyanate (XDI), toluene diisocyanate (TDI), isophorone diisocyanate (IPDI), 1,5-naphthalene diisocyanate (NDI), 4,4',4''-triphenylmethane diisocyanate, and their isocyanurate-containing derivatives. Mixtures or the reaction products of polyisocyanates can be used. Polyisocyanates contain the reaction products of these diisocyanate including isocyanurate, urea, allophanate, biuret, carbodiimide, and uretonimine entities.

Examples of polyisocyanates include ethylene diisocyanate, 1,4-tetramethylene diisocyanate, 1,6-hexamethylene diisocyanate (HDI), 1,12-dodecane diisocyanate, cyclobutane, 1,3-diisocyanate, 1-isocyanato-3,3,5-trimethyl-5-isocyanato methyl cyclohexane, bis(4-isocyanato cyclohexyl) methane, isophorone diisocyanate (IPDI), bis(4-isocyanatocyclohexo)methane; 4,4'-methylenedicyclohexyl diisocyanate; 1,6-diisocyanato-2,2,4,4-tetramethylhexane; 1,6-diisocyanato-2,4,4-trimethylhexane; cyclohexane-1,4-diisocyanate; etc. Desmodur H® from Bayer Inc. is described as HDI having an NCO content of 50%, and Desmodur W from Bayer Inc. is described as bis (4-isocyanato-cyclohexyl)methane containing 32% of NCO.

In another embodiment, the isocyanate reactive group is a polyol. The polyol may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction include products obtained by the polymerization of a cyclic oxide including ethylene oxide, propylene oxide or tetrahydrofuran, or mixtures thereof. Polyether polyols include polyoxypropylene (PPO) polyols, polyoxyethylene (PEO) polyols, poly(oxyethylene-co-oxypropylene) polyols, polyoxytetramethylene (PTMO) polyols.

Polycarbonate polyols useful for the polyurethane reaction include the products represented by the reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries.

In another embodiment, the isocyanate reactive group may be of ionic, ionic precursor or nonionic type. The isocyanate-reactive group include those compounds containing active hydrogen such as diols, polyols, diamines, and polyamines. The isocyanate reactive groups include anionic and cationic types. Anionic types include dihydroxy carboxylic acids such as alpha, alpha-dimethylolpropionic acid (DMPA), diamino carboxylic acids such as 1-carboxy, 1,5-diaminopentane, and 2-(aminoethyl) aminoethyl carboxylic acid; and sulfonate diamines. Anionic type of hydrophilic groups may be the ones that readily form the salts of sulpho, sulfate, thiosulphato, phospho, phosphono, phosphato, or carboxy groups. Examples for cationic type include tertiary amino groups or precursors which readily form salts such as quaternary ammonium, quaternary phosphonium or ternary sulphonium salt groups.

Specific examples of the compounds containing ionic precursor groups and two or more isocyanate-reactive groups include triethanolamine, N-methyldiethanolamine and their oxyalkylation and polyeserification products, trimethylolpropane monophosphate and monosulphate, bishydroxylmethyl-phosphonic acid, diaminocarboxylic acids including lysine, cystine, 3,5-diamino benzoic acid, 2,6-dihyroxybenzoic acid, and dihydroxyalkanoic acids including 2,2-dimethylolpropionic acid.

Where a hydrophilic group is unreacted in preparing a polyurethane then a neutralizing compound for the hydrophilic group may be added to the reaction. Amines or ammonia such tertiary amines, such as triethylamine, triethanolamine or N-methylmorpholine, and diethyl amine or triethylamine, are effective in neutralizing carboxylic group and yields a neutralized anionic hydrophilic site on the polyurethane. In one embodiment, a chain extender that reacts with the excess or available isocyanate groups in the presence of aqueous medium and leads to a high molecular weight polyurethane aqueous dispersion. Suitable chain extenders for the further polymerization in aqueous medium are well known in the art. Selected examples include ethylene diamine, diethylene triamine, triethylene tetraamine, propylene diamine, butylene diamine, hexamethylene diamine, cyclohexylene diamine, piperazine, tolylene diamine, xylylene diamine and isophorone diamine.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, Sancure 1818®, Sancure 853®, Sancure 830®, Sancure 825®, Sancure 776®, Sancure 850®, Sancure 12140®, Sancure 12619®, Sancure 835®, Sancure 843®, Sancure 898®, Sancure 899®, Sancure 1511®, Sancure 1514®, Sancure 1517®, Sancure 1591®, Sancure 2255®, Sancure 2260®, Sancure 2310®, Sancure 2725®, and Sancure 12471® (all of which are commercially available from Noveon, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia), NeoRez R-940 (Avecia), NeoRez R-960 (Avecia), NeoRez R-962 (Avecia), NeoRez R-966 (Avecia), NeoRez R-967 (Avecia), NeoRez R-972 (Avecia), NeoRez R-9409 (Avecia), NeoRez R-9637 (Avecia), NeoRez R-9649 (Avecia), and NeoRez R-9679 (Avecia).

Particularly useful polyurethanes are aliphatic polyether polyurethanes. Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the binder is polyester polyurethane. Examples of these binder include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company Avecia, and the acrylic copolymer dispersion sold under the name "Neocryl XK-90" by the company Avecia.

In one embodiment, the binder may be an aliphatic urethane acrylate. These materials are oligomers, such as Ebecryl® 8806, having an average molecular weight of about 2,000 and a viscosity of about 10,500 centipoise, at 150.degree. F. and manufactured and sold by Radcure Specialties, Inc. and Photomer® 6210 an aliphatic urethane acrylate oligomer having a molecular weight of about 1400, a viscosity of about 1500 centipoise at about 160° F. and manufactured and sold by Henkel Corporation.

In another embodiment, the binder is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins includes those derived from acrylic acid, acrylate esters, acrylamide, methacrylic acid, methacrylate esters, and methacrylamide. The acrylate and methacrylate ester generally contain from 1 to about 30 carbon atoms in the pendant group, or from 1 to about 18, or from 2 to about 12 carbon atoms in the pendant group.

Examples of commercial polyacryls and polymethacryls include Gelva® 2497 (commercially available from Solutia Co., St. Louis, Mo.), Duraplus® 2 (commercially available from Rohm & Haas Co., Philadelphia, Pa.), Joncryl® 95 (commercially available from S.C. Johnson Polymer, Sturtevant, Wis.), SCX-1537 (S.C. Johnson Polymer), SCX-1959 (S.C. Johnson Polymer), SCX-1965 (S.C. Johnson Polymer), Joncryl® 530 (S.C. Johnson Polymer), Joncryl® 537 (S.C. Johnson Polymer), Glascol LS20 (commercially available from Allied Colloids, Suffolk, Va.), Glascol C37 (Allied Colloids), Glascol LS26 (Allied Colloids), Glascol LS24 (Ciba Specialty Chemicals), Glascol LE45 (Ciba Specialty Chemicals), Carboset® CR760 (commercially available from Noveon, Cleveland, Ohio), Carboset® CR761 (Noveon), Carboset® CR763 (Noveon), Carboset® 765 (Noveon), Carboset® 19X2 (Noveon), Carboset® XL28 (Noveon), Hycar 26084 (Noveon), Hycar 26091 (Noveon), Carbobond 26373 (Noveon), Neocryl® A-601 (commercially available from Avecia, Wilmington, Mass.)Neocryl® A612 (Avecia), Neocryl® A-6044 (Avecia), Neocryl® A-622 (Avecia), Neocryl® A-623 (Avecia), Neocryl® A-634 (Avecia), and Neocryl® A-640 (Avecia).

In another embodiment, the binder is a thermoplastic copolymer derived from ethylene or propylene and a functional monomer selected from the group consisting of alkyl acrylate, acrylic acid, alkyl acrylic acid, and combinations of two or more thereof. The term "copolymer" as used herein includes polymers of two or more monomers, and thus includes terpolymers. In one embodiment, the functional monomer is selected from alkyl acrylate, acrylic acid, alkyl acrylic acid, and combinations of two or more thereof. The alkyl groups in the alkyl acrylates and the alkyl acrylic acids typically contain 1 to about 8 carbon atoms, and, in one embodiment, 1 to about 2 carbon atoms. The functional monomer(s) component of the copolymer or terpolymer ranges from about 1 to about 15 mole percent, and, in one embodiment, about 1 to about 10 mole percent of the copolymer or terpolymer molecule. Examples include: ethylene/methyl acrylate copolymers; ethylene/ethylacrylate copolymers; ethylene/butyl acrylate copolymers; ethylene/methacrylic acid copolymers; ethylene/acrylic acid copolymers; anhydride-modified low density polyethylenes; anhydride-modified linear low density polyethylene, and mixtures of two or more thereof.

Ethylene/acrylic acid copolymers are available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97 C and a $T_g$ of about −7.7° C. The ethylene/methyl acrylate copolymers available from Chevron under the tradename EMAC can be used. These include EMAC 2205, which has a methyl acrylate content of 20% by weight and a melting point of 83 C, and EMAC 2268, which has a methyl acrylate content of 24% by weight, a melting point of about 74° C. and a $T_g$ of about −40.6° C.

In one embodiment, the binder is an ionomer (polyolefins containing ionic bonding of molecular chains). Ionomer resins available from DuPont under the tradename Surlyn can also be used. These are identified as being derived from sodium, lithium or zinc and copolymers of ethylene and methacrylic acid. These include Surlyn 1601, which is a sodium containing ionomer having a melting point of 98° C., Surlyn 1605, which is a sodium containing ionomer having a melting point of about 90° C. and a $T_g$ of about −20.6° C., Surlyn 1650, which is a zinc containing ionomer having a melting point of 97° C., Surlyn 1652 which is a zinc containing ionomer having a melting point of 100° C., Surlyn 1702, which is a zinc containing ionomer having a melting point of 93° C, Surlyn 1705-1, which is a zinc containing ionomer having a melting point of 95° C., Surlyn 1707, which is a sodium containing ionomer having a melting point of 92° C., Surlyn 1802, which is a sodium containing ionomer having a melting point of 99° C., Surlyn 1855, which is a zinc containing ionomer having a melting point of 88° C., Surlyn 1857, which is a zinc containing ionomer having a melting point of 87° C., and Surlyn 1901, which is a sodium containing ionomer having a melting point of 95° C.

In one embodiment, the binder is a combination of a polyurethane and a polyacryl. In this embodiment, the polyurethane is typically present in an amount of about 10% to about 90%, or from about 20% to about 80%, or from about 30% to about 70% of the solids of the coating composition. The polyacryl is typically present in an amount of about 10% to about 90%, or from about 20% to about 80%, or from about 30% to about 70% of the solids of the coating composition. The ratio of the polyurethane to the polyacryl is from about 0.1 to about 9, or from about 0.25 to about 4, or from about 0.4 to about 2.5 to 1.

In another embodiment, the binder may be a polyvinyl alcohol. Useful polyvinyl alcohols are available commercially from a variety of sources. Celvol 205, Celvol 540 and Celvol 523 are polyvinyl alcohols available from Celanese and these polymers have a degree of polymerization of from 350–2000.

In another embodiment, the binder is a polyester. The polyester may be one or more of those disclosed for preparing the above polyurethanes. In another embodiment, polyesters are prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

In another embodiment, the binder is a polyamide. Useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, International Paper of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from International Paper include Uni-Rez 2665; Uni-Rez 2620; Uni-Rez 2623; and Uni-Rez 2695.

In another embodiment, the binder is a polyolefin. The polyolefins which include polymers and copolymers of olefin monomers containing from 2 to about 12 carbon atoms such as ethylene, propylene, 1-butene, etc., or blends of mixtures of such polymers and copolymers. In one embodiment, the polyolefins comprise homopolymers and copolymers of ethylene and propylene. In one embodiment, the polyolefins comprise propylene homopolymers, and copolymers such as propylene-ethylene and propylene-1-butene copolymers. In another embodiment, the polyolefins are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content. Various polyethylenes can be utilized as the polymeric film material including low, medium, and high density polyethylenes. An example of a useful low density polyethylene (LDPE) is Rexene 1017 available from Huntsman. A number of useful propylene homopolymers are available commercially from a variety of sources, and some useful polymers include: 5A97, available from Dow Chemical and having a melt flow of 12.0 g/10 min and a density of 0.90 g/cm$^3$; DX5E66, also available from Dow Chemical and having an MFI of 8.8 g/10 min and a density of 0.90 g/cm$^3$; and WRD5-1057 from Dow Chemical having an MFI of 3.9 g/10 min and a density of 0.90 g/cm$^3$. Useful commercial propylene homopolymers are also available from Atofina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one preferred embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Dow Chemical. A propylene-ethylene copolymer containing about 3.2% by weight of ethylene is available from Dow Chemical under the designation D56D20. Another Dow Chemical propylene-ethylene copolymer is D56D8, which contains 5.5% by weight of ethylene.

In another embodiment, the binder may be polyvinylpyrolidone or a copolymer of an N-vinyl pyrrolidone with vinyl acetate and/or acrylates. Examples of these polymers include PUP K-90, PUP/VA S-630, and Viviprint III from ISP (International Specialty Products). In another embodiment, the binder is a water-soluble polyoxazoline. An example of this type of polymer is poly (2-ethyl-2-oxazoline) from Polymer Chemistry Innovation under the designation Aquazol 500.

In another embodiment, the binder is a cellulosic polymer. The cellulosic polymers include polymers derived from cellulose such as are known in the art. An example of a cellulosic polymer includes cellulose esters. Useful cellulosic polymers include carboxyethyl cellulose, dextrin, methyl cellulose, ethyl cellulose, hydroxyethyl cellulose, hydroxypropylcellulose, hydroxypropylmethyl cellulose nitrocellulose, cellulose acetate, cellulose acetate butyrate, and cellulose acetate propionate. Exemplary nitrocellulose polymers are Klucel-L, Natrosol 250-LR and Culminal MHPC 50, all from Hercules.

In another embodiment, the binder is a rubber. These rubbers include synthetic rubbers, such as isoprene rubbers, neoprene rubbers, polydiene polymers such as styrene-butadiene copolymers, styrene-acrylonitrile-butadiene terpolymers, styrene-isoprene copolymers, polybutadiene, polyalkenes, such as polybutene, polyisobutylene, polypropylene and polyethylene. The rubber based elastomers, such as linear, branched, grafted, or radial block copolymers represented by the diblock structures A-B, the triblock A-B-A, the radial or coupled structures (A-B)$_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly useful rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. Useful conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Specific examples of diblock copolymers include styrene-butadiene (SB), styrene-isoprene (SI), and the hydrogenated derivatives thereof. Examples of triblock polymers include styrene-butadiene-styrene (S.S.), styrene-isoprene-styrene (SIS), alpha-methylstyrene-butadiene-alpha-methylstyrene, and alpha-methylstyrene-isoprene alpha-methylstyrene. Examples of commercially available block copolymers include those available from Shell Chemical Company.

Upon hydrogenation of the S.S. copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (STEPS) block copolymer.

The selective hydrogenation of the block copolymers may be carried out by a variety of well known processes including hydrogenation in the presence of such catalysts as Randy nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Particularly useful hydrogenated block copolymers are hydrogenated products of the block copolymers of styrene-isoprene-styrene such as a styrene-(ethylene/propylene)-styrene block polymer. A number of selectively hydrogenated block copolymers are available commercially from Shell Chemical Company under the general trade designation "Keaton G." One example is Keaton G1652 which is a hydrogenated S.S. triblock comprising about 30% by weight of styrene end blocks and a midblock which is a copolymer of ethylene and 1-butene (EB). A lower molecular weight version of G1652 is available from Shell under the designation Keaton G1650. Keaton G1651 is another SEBS block copolymer which contains about 33% by weight of styrene. Keaton G1657 is an SEBS diblock copolymer which contains about 13% w styrene. This styrene content is lower than the styrene content in Keaton G1650 and Keaton G1652.

In another embodiment, the block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Keaton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Keaton FG1901X, FG1921X, and FG1924X from Shell, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

In another embodiment, the binders are ethylene alpha-olefin copolymers. These copolymers include ethylene-propylene or ethylene-propylene-diene copolymers. In either event, the average ethylene content of the copolymer could be as low as about 20% and as high as 90% to 95% on a weight basis. The remainder is either propylene or diene. In a preferred embodiment, the copolymers will contain from about 50% or 60% by weight up to about 80% by weight of ethylene.

The ethylene, alpha-olefin copolymers are available commercially from a variety of sources. For example, a variety of ethylene/propylene copolymers are available from Polysar Corp. (Bayer) under the general trade designation "POLYSAR." Particular examples include POLYSAR EPM 306 which is an ethylene/propylene copolymer containing 68 weight percent ethylene and 32 weight percent propylene; POLYSAR EPDM 227 is a copolymer of ethylene, propylene and 3% ENB wherein the ethylene/propylene ratio is 75/25. An example of a copolymer containing a smaller amount of ethylene is POLYSAR EPDM 345 which contains 4% ENB and the weight ratio of ethylene/propylene is 60/40. Bayer XF-004 is an experimental EPDM containing 65 weight percent of ethylene, 32% by weight of propylene and 3% by weight of norbornenediene (NB). Another group of ethylene/propylene rubbers are available from Bayer under the general trade designation "BUNA AP." In particular, BUNA AP301 is an ethylene/propylene copolymer containing 51% ethylene and 49% propylene; BUNA AP147 is a copolymer containing 4% ENB and the weight ratio of ethylene/propylene is 73/27.

Ethylene/propylene rubbers are also available from Exxon Chemical Company. One example is VISTALON 719 which has a typical ethylene content of 75%, a typical Mooney viscosity (at 127° C.) of 54, and a specific gravity of 0.87.

In another embodiment, the binder is a homopolymer or copolymer of vinyl acetate. Examples of these polymers include polyvinyl acetate, polyethylene vinyl acetate, acrylic acid or acrylate-modified ethylene vinyl acetate resins, acid-, anhydride- or acrylate-modified ethylene/vinyl acetate copolymers; acid- or anhydride-modified ethylene/acrylate copolymers. Examples of commercially available copolymers that can be used include the ethylene/vinyl acetate copolymers available from Air Products & Chemicals, Inc., Allentown, Pa., under the AIRFLEX trademark. Examples include AIRFLEX 465® (65% solids) and AIRFLEX 7200® (72–74% solids). Another suitable EVA emulsion polymer is AIRFLEX 426®, a high solids, carboxylated, EVA polymer partially functionalized with carboxyl groups. AIRFLEX 430® is an ethylene-vinyl acetate-vinyl chloride terpolymer. It is believed that the AIRFLEX brand EVA emulsion polymers are stabilized with up to about 5% by weight polyvinyl alcohol (PVOH) and/or, in some formulations, a nonionic surfactant.

Examples of commercially available copolymers that can be used include the ethylene/vinyl acetate copolymers available from DuPont under the tradename Elvax. These include Elvax 3120, which has a vinyl acetate content of 7.5% by weight and a melting point of 99° C., Elvax 3124, which has a vinyl acetate content of 9% by weight and a melting point of 77° C., Elvax 3150, which has a vinyl acetate content of 15% by weight and a melting point of 92° C., Elvax 3174, which has a vinyl acetate content of 18% by weight and a melting point of 86° C., Elvax 3177, which has a vinyl acetate content of 20% by weight and a melting point of 85° C., Elvax 3190, which has a vinyl acetate content of 25% by weight and melting point of 77° C., Elvax 3175, which has a vinyl acetate content of 28% by weight and a melting point of 73° C., Elvax 3180, which has a vinyl acetate content of 28% by weight and a melting point of 70° C., Elvax 3182, which has a vinyl acetate content of 28% by weight and a melting point of 73° C., and Elvax 3185, which has a vinyl acetate content of 33% by weight and a melting point of 61° C., and Elvax 3190LG, which has a vinyl acetate content of 25% by weight, a melting point of about 77° C. and a glass transition temperature ($T_g$) of about −38.6° C. Commercial examples of available polymers include Escorene UL-7520, a copolymer of ethylene with 19.3% vinyl acetate (Exxon).

In one embodiment, the binder is a polystyrene. Polystyrenes include homopolymers as well as copolymers of styrene and substituted styrene such as alpha-methyl styrene in addition to the polydienes described above. Examples of styrene copolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillip Petroleum Co. KR-10 is believed to be a copolymer of styrene with 1,3-butadiene. Another useful polystyrene is a copolymer of styrene and an alkyl acrylate in which the alkyl moiety has 1 to 6 carbon atoms. Butyl acrylate is especially useful as the comonomer of styrene. One particular commercially available source of the copolymer is the styrene/butyl acrylate copolymer dispersion available under the Trademark ACRONAL S312D, S320D and S305D from BASF.

In one embodiment, the binder is a styrene-acryl copolymer. The acryl component is describe above. In one embodiment, the acryl may be an acrylic acid or ester, an acrylonitrile or their methacrylic analogs. Examples of the these resins include Microgel E-1002, E-2002, E-5002 (styrene acryl resin emulsion, available from Nippon Paint Co., Ltd.), Voncoat 4001 (acryl emulsion, available from Dainippon Ink & Chemicals, Inc.), Voncoat 5454 (styrene acryl resin emulsion, available from Dainippon Ink & Chemicals, Inc.), SAE 1014 (styrene acryl resin emulsion, available from Nippon Zeon Co., Ltd.), Saivinol SK-200 (acryl resin emulsion, available from Saiden Chemical Industry Co., Ltd.), Nanocryl SBCX-2821 (silicone-modified acryl resin emulsion, available from Toyo Ink Mfg. Co., Ltd.), Nanocryl SBCX-3689 (silicone-modified acryl resin emulsion, available from Toyo Ink Mfg. Co., Ltd.), #3070 (methacrylic acid methyl polymer resin emulsion, available from Mikuni Color Limited), SG-60 (styrene-acryl resin emulsion, available from Gifu Ceramic Co., Ltd.), and Grandol PP-1000 (Styrene-acryl resin emulsion, available from Dainippon Ink & Chemicals, Inc.).

In another embodiment, the binder is a polyvinylchloride resin (sometimes referred to herein as PVC resins). These resins are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides, such as vinyl fluoride and vinyl bromide; alpha-olefins, such as ethylene, propylene and butylene; vinyl esters, such as vinyl acetate, vinyl propionate, vinyl butyrate and vinyl hexanoate, or partially hydrolyzed products thereof, such as vinyl alcohol; vinyl ethers, such as methyl vinyl ether, propyl vinyl ether and butyl vinyl ether; acrylic esters, such as methyl acrylate, ethyl acrylate, methyl methacrylate and butyl methacrylate and other monomers, such as acrylonitrile, vinylidene chloride and dibutyl maleate. Such resins are generally known any many are commercially available. A particularly useful polyvinylchloride resin is the homopolymer of vinyl chloride.

Examples of polyvinylchloride resins that are commercially available include GEONÒ 92, a medium high molecular weight porous suspension PVC resin; GEONÒ 128, a high molecular weight dispersion grade polyvinylchloride resin; and GEONÒ 11X 426FG, a medium molecular weight PVC resin. The GEONÒ resins are available from the Geon Company. The number average molecular weights of the PVC resins useful in the present invention may range from about 20,000 up to about 80,000, and a typical range of about 40,000 to about 60,000.

The nano-sized inorganic particles which are included in the mixtures utilized to form the nano-porous layers of the labels of the present invention typically have an average primary particle diameter of less than 100 nanometers (nm). In one embodiment, the average primary particle diameter may range from about 5 to 40 nanometers, and in another embodiment, the average primary particle diameter is in the range of from about 8 to about 20 nanometers. In yet another embodiment, the average primary particle diameter is in the range of from about 10 to about 15 nanometers. In one embodiment, the inorganic particles which are utilized in the nano-porous layers of the present invention are those which have a surface area of at least 1 $m^2/g$. The surface area may range up to about 200 $m^2/g$ or higher. The surface area of the inorganic particles is determined by BET (Brunauer, Emmett and Teller) method described in J. American Chemical Society, Volume 60, page 309 (1938). This method is based on the absorption of gaseous nitrogen.

Examples of nano-sized particles which are useful in the present invention include colloidal silica, colloidal alumina, silica-alumina composite sols, nano-sized silica gel, nano-sized titanium dioxide, nano-sized calcium carbonates, or mixtures thereof. In one embodiment, the inorganic particles are selected from colloidal silica and colloidal alumina which are characterized as having average primary particle diameters of from about 5 to about 40 nm. Some of these nano-sized porous particles are available commercially. For example, colloidal aluminas are available from CONDEA Vista Company, 900 Threadneedle, Houston, Tex. 77224 under the general tradenames Disperal and Dispal. Dispal 18N4-20 is a liquid boehmite alumina system containing 20% aluminum oxide. The primary particle size of the alumina is 15 nm, and the dispersed particle size is 120 nm. Dispal 23N4-20 is another liquid boehmite alumina system which has a dispersed particle size of 100 nm. Dispal 14N4-25 is a liquid boehmite alumina system containing 25% alumina and having a dispersed particle size of 140 nm.

Useful alumina sols are available from Nissan Chemical Industries under the general designations Aluminasol #1, Aluminasol 100 and Aluminasol 200.

Colloidal silica (silica sols) useful in the present invention are available commercially from Nissan Chemical Industries under the designations Snowtex ST-PS-S, Snowtex ST-PS-MO, Snowtex ST-PS-M, Snowtex ST-OUP, and Snowtex ST-UP; from DuPont Specialty Chemicals under the designations Ludox CL and Ludox AM; and from Grace Davison under the designation Sylojet 4000C. Sub-micron (or nano-sized) silica gels useful in this invention are commercially available from Grace Davison. One example is Sylojet 703.

Other additives may be included in the mixtures (compositions) used to form the nano-porous layer to obtain certain desired characteristics, such as waxes, defoamers, surfactants, colourants, anti-oxidants, surfactants, pH adjustment agents, UV stabilizers, luminescents, cross-linkers, antistatic agents, anti-blocking agents, humectants, anti-slip agents biocides, etc. Thus, the nano-porous layer may contain one or more fluorescent whitening agents or optional brighteners designed to brighten colors or mask yellowing. These additives are colorless to weakly colored organic compounds that will absorb ultraviolet light and re-emit a blue fluorescent light. A number of fluorescent whitening agents are available commercially such as from Ciba Specialty Chemicals under the general trade designations "Ciba®Uvitex®" and "Ciba®Tinopal®". Specific examples include: Ciba Uvitex FP, which is 4,4'-bis(2-methoxystyryl)-1,1'-biphenyl; Ciba Uvitex OB which is 2,5-thiophenediyl-bis (5-tert-butyl-1,3-benzoxazole); Ciba Uvitex OP-ONE which is 4,4'-bis(benzoxazol-2-yl) stilbene; Ciba Tenopal SFP; and Ciba Tenopal PT. An example of a useful surfactant is Sylwet 7210, an organasilicone from Witco.

It has been observed that the nano-porous layer dissipates static from the side of the label containing the nano-porous layer. In one embodiment, the lower surface of the nano-porous layer exhibits a low electrostatic charge such as, for example, about 2 to 4 kilovolts.

In one embodiment, the nano-porous layer includes a wax. The wax is typically present in an amount from about 0.5% to about 10%, or from about 1% to about 5% of the solids of the coating composition. The wax helps improve scratch resistance. In one embodiment, the particles in the wax are less than 5, or less than 0.5 microns in size. The melting point of the wax or of the mixture of waxes preferably ranges from 50–150° C. In addition, the particles in the microdispersion can contain a small amount of oily or pasty fatty additives, one or more surfactants and one or more common liposoluble active ingredients, The waxes include natural (animal or plant) or synthetic substances which are solid at room temperature (20–25° C.). In one embodiment, they are insoluble in water, soluble in oils and are capable of forming a water-repellent film. A definition of waxes is provided by, for example, P. D. Dorgan, Drug and Cosmetic Industry, December 1983, pp. 30–33. The wax(es) includes carnauba wax, candelilla wax and alfalfa wax, and mixtures thereof.

In addition to these waxes, the mixture of waxes can also contain one or more of the following waxes or family of waxes: paraffin wax, ozokerite, plant waxes, such as olive wax, rice wax, hydrogenated jojoba wax or the absolute waxes of flowers, such as the essential wax of blackcurrant flower sold by the company Bertin (France), animal waxes, such as beeswaxes or modified beeswaxes (cerabellina); other waxes or waxy starting materials; marine waxes, such as those sold by the company Sophim under the identifier M82; natural or synthetic ceramides, and polyethylene or polyolefin waxes in general. The carnauba (extract of *Copernica cerifera*), candelilla (extract of *Euphorbia cerifera* and of *Pedilantus pavonis*) and alfalfa (extract of *Stipa tenacissima*) plant waxes are commercial products. Examples of commercially available waxes are Aquacer 499, 520, 537, 608 available from Byk Cera.

In another embodiment, the nano-porous layer may include a cross linking agent. When present, the amount of cross-linking agent may range from about 0.01% to about 20%, or from about 0.3% to about 1.5%, or from about 0.5% to about 1% by weight, based on the solids in the layer. The cross linking agent may be any of those known in the art. The cross linking agents may be organic or inorganic. A combination of cross linking agents may be used. The cross linking agents include such as epoxy compounds, polyfunctional aziridines, methoxyalkyl melamines, triazines, polyisocyanates, carbodiimides, polyvalent metal cations, and the like. The cross linking agent supplied by Avecia Resins under the tradename NeoCryl CX 100 and the cross linking agent supplied by EIT Industries under the tradename XAMA-7 are specific examples of polyfunctional aziridine cross linking agents and the cross linking agent supplied by Union Carbide under the tradename Ucarlink XL-29SE is a specific example of a polyfunctional carbodimide cross linking agent which may be used. In another embodiment, the cross linking agent is a metal containing crosslinking agent. The cross linking agents include the organometallic catalysts containing metals of group III-A, IV-A, V-A, VI-A, VIII-A, I-B, II-B, III-B, IV-B and V-B. Particularly useful cross linking agents are tin dioctoate, tin naphthenate, dibutyltin dilaurate, dibutyltin diacetate, dibutyltin dioxide, dibutyl tin dioctoate, zirconium chelates, aluminum chelates, aluminum titanates, titanium isopropoxide, triethylene diamine, p-toluene sulfonic acid, n-butyl phosphoric acid, and mixtures thereof. An example of a Zirconium based cross-linker is Bacote 20 from Magnesium Electron Ltd.

In one embodiment, the compositions utilized to form the nano-porous layer may contain water and/or other suitable diluent such as alcohol, toluene, heptane, methylethylketone, ethylacetate etc. The diluent is typically present in an amount from about 10% to about 90%, or from about 20% to about 80% by weight.

In one embodiment, the composition used to form the nano-porous layer is coated onto the polymer facestock. The film facestocks may be monolayer or multilayer constructions. The multilayer constructions may be coextruded or laminated.

The nano-porous layer can be formed on the facestocks in various manners, for instance by means of engraving coating (e.g., direct gravure, reverse gravure, etc.), slot die, off-set coating, roll coating, curtain coating, or a casting process. The choice for a certain production method depends on the raw material characteristics and the desired thickness of the nano-porous layer.

Drying of a water or diluent based system can be done by the usual thermal drying techniques, by means of microwaves or by infrared drying. Solvent-less systems can be cured thermally, by means of UV curing or Electron Beam curing.

Alternatively, the nano-porous layer can be extruded onto the polymer facestock. In yet another embodiment, the facestock and nano-porous layers can be formed by coextrusion.

In one embodiment, the nano-porous layer is applied to a facestock in the following manner. A nano-porous composition, which is a dispersion or emulsion containing one (or more) binder(s) and one or more nano-sized particles is applied to a film facestock by means of techniques known in the industry. In a ventilated oven, the diluent or water is evaporated, after which a nano-porous layer with the desired thickness is obtained. If desired one or more layers between the film facestock and the nano-porous layer can be provided. These may serve to obtain certain desired additional characteristics, such as improved adhesion, a desired color, opacity etc.

The following Examples 1–35 illustrate compositions containing nano-sized particles and binder which are useful in forming the nano-porous layers used in this invention, and their preparation. These examples are illustrative and not intended to be limiting in scope. Unless otherwise indicated in the following examples, the claims, or elsewhere in the written description, temperatures are ambient temperatures, pressures are at atmospheric pressure, amounts are parts by weight, and the temperatures are in degrees Celsius.

EXAMPLE 1

A two-liter vessel equipped with a 4-bladed propeller stirrer is charged with 650 parts of deionized water, and there is added to the water at room temperature, 30 parts of Celvol 540 and 45 parts of Celvol 523 with stirring. The temperature of the mixture is then raised to 90° C. and maintained at this temperature for 40 minutes. The mixture then is allowed to cool to room temperature, and 2.4 parts of 5% sodium bicarbonate solution, 0.3 part of Silwett L7210 (a silicone surfactant from Witco) and 0.06 part of Kathon LX (1.5%) are added with stirring to form a binder solution.

In a separate reaction vessel equipped with a 4-bladed propeller stirrer, the coating composition is prepared by adding 50 parts of the above prepared binder solution to 100 parts of Dispal 18N4-20 with agitation at room temperature. The agitation is continued for 30 minutes.

EXAMPLES 2–19

The general procedure of Example for preparing coating composition is repeated by varying the binder and pigment, as well as amount thereof, as indicated in the following Table.

TABLE

Coating Compositions*

| | | Nano-Sized Particles (pbw) | | |
| --- | --- | --- | --- | --- |
| Example | Celvol 205 Binder (pbw) | Dispal 14N4-25 | Dispal 18N4-20 | Dispal 23N4-20 |
| 2 | 7 | 93 | | |
| 3 | 10 | 90 | | |
| 4 | 15 | 85 | | |
| 5 | 20 | 80 | | |
| 6 | 30 | 70 | | |
| 7 | 40 | 60 | | |
| 8 | 7 | | 93 | |
| 9 | 10 | | 90 | |
| 10 | 15 | | 85 | |
| 11 | 20 | | 80 | |
| 12 | 30 | | 70 | |
| 13 | 40 | | 60 | |
| 14 | 7 | | | 93 |
| 15 | 10 | | | 90 |
| 16 | 15 | | | 85 |
| 17 | 20 | | | 80 |
| 18 | 30 | | | 70 |
| 19 | 40 | | | 60 |

*All Examples contained 0.01 pbw of Sylwet 7210.

EXAMPLES 20–35

The general procedure of Example 1 is followed except that the binder, nano-sized pigment particles and the relative amounts thereof are varied as indicated in the following Table.

TABLE

Coating Compositions

| Example | Binder | Nano-Sized Particles | Binder Particle Weight Ratio |
|---|---|---|---|
| 20 | Celvol 540 | Aluminasol 200 | 20/80 |
| 21 | Celvol 540 | Aluminasol #1 | 7.8/91.2 |
| 22 | Celvol 540 | Aluminasol #1 | 20/80 |
| 23 | Klucel-L | Aluminasol #1 | 15/85 |
| 24 | Celvol 540/S-630 | Aluminasol #1 | 26/15/58 |
| 25 | Klucel-L | Sylojet 703 | 70/30 |
| 26 | Celvol 540 | Sylojet 703 | 70/30 |
| 27 | Celvol 205 | Sylojet 4000C | 7.0/93 |
| 28 | Celvol 205 | Sylojet 4000C | 30/70 |
| 29 | Celvol 540 | Ludox CL | 40/60 |
| 30 | Celvol 540 | Snowtex ST-OUP | 18/82 |
| 31 | Celvol 540 | Snowtex ST-PS-MO | 40/60 |
| 32 | Celvol 540 | Snowtex ST-PS-M | 20/80 |
| 33 | Celvol 540 | Snowtex ST-PS-M | 40/60 |
| 34 | Celvol 540 | Snowtex ST-PS-M | 60/40 |
| 35 | Celvol 540 | Snowtex ST-PS-S | 20/80 |

As noted above, the labels of the invention also may comprise a metal layer 13 overlying the upper surface of the facestock (FIGS. 2 and 6–8) or underlying the lower surface of the facestock (FIGS. 9–11). In one embodiment, the metal layer is in contact with and is adhered to the upper surface of the facestock which may have been previously corona treated or flame treated. The metal coating may be applied to the upper or lower surfaces of the facestock by any known methods such as electroplating, sputtering, vacuum metalizing, printing, etc. Chemical primers or other adhesion promoting compositions may in some instances, be applied to the surface of the facestock to increase the adhesion of the metal to the facestock.

The metal of the metal layer, may be any of a number of metals including tin, chromium, nickel, stainless steel, copper, aluminum, indium, gold, silver, and alloys thereof. The metal layer, in one embodiment, has a thickness of from about 0.1 to about 5 microns, and in another embodiment, from about 0.5 to about 3 mils. Alternatively the coating weight of the metal layer may range from about 0.5 to about 5 g/m$^2$ or from about 0.5 to about 2 or 3 g/m$^2$.

Useful metallized films are available commercially. Examples of such metallized films include the following:

| Metallized Film Name | Thickness (mils) | Gurley Stiffness (mg) MD | CD |
|---|---|---|---|
| Mobil 50 ML 534 Met BOPP | 2 | 14 | 24 |
| AET met OPP | 3.5 | 54 | 81 |
| AET met PET | 2.3 | 35 | 36 |
| AET OPP MCS 211-125 cls | 3.2 | 41 | 70 |

Although not shown in FIGS. 1–11, the labels of the present invention may also contain a layer of an ink-receptive composition on the facestock layer 11 or the metal layer 13 which enhances the printability of the facestock or metal layer, and the quality of the print layer thus obtained. A variety of such compositions are known in the art, and these compositions generally include a binder and a pigment, such as silica or talc, dispersed in the binder. The presence of the pigment decreases the drying time of some inks. A number of such ink-receptive compositions is described in U.S. Pat. No. 6,153,288 (Shih et al) and the disclosure of this patent is hereby incorporated by reference. In addition to the ink-receptive compositions described in said '288 patent, the compositions described above for the nano-porous layer can also be utilized as the ink-receptive layer.

The labels the present invention may, and generally do, comprise one or more print layers. In one embodiment, illustrated in FIGS. 7 and 8, a print layer 14 is adhered to the upper surface of the metal layer 13. In the embodiment illustrated in FIGS. 10 and 11, the print layer 14 is in contact with the upper surface of the facestock layer 11.

The print layer may be an ink or graphics layer, and the print layer may be a mono-colored or multi-colored print layer depending on the printed message and/or the intended pictorial design. These include, variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer is formed in the conventional manner by depositing, by gravure printing or the like, an ink composition comprising a resin of the type described above, a suitable pigment or dye and one or more suitable volatile solvents onto one or more desired areas of the metal layer. After application of the ink composition, the volatile solvent component(s) of the ink composition evaporate(s), leaving only the non-volatile ink components to form the print layer. An example of a suitable resin for use in forming a polyester ink is ViTEL® 2700 (Bostik-Findley)—a copolyester resin having a high tensile strength (7000 psi) and a low elongation (4% elongation). A ViTEL® 2700-based polyester ink composition may comprise 18% ViTEL® 2700, 6% pigment, 30.4% n-propyl acetate (NP Ac) and 45.6% toluene. As can readily be appreciated, ViTEL® 2700 is, by no means, the only polyester resin that may be used to formulate a polyester ink, and solvent systems, other than an NP Ac/toluene system, may be suitable for use with ViTEL® 2700, as well as with other polyester resins. An example of a polyester adhesive composition comprises 10.70%, by weight, ViTEL® 2300 polyester resin; 10.70%, by weight, ViTEL® 2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone.

The adhesion of the ink to the surface of the metal layer can be improved, if necessary, by techniques well known to those skilled in the art. For example, as mentioned above, an ink primer or other ink adhesion promoter can be applied to the metal layer or the facestock layer before application of the ink. Alternatively the surface of the facestock can be corona treated or flame treated to improve the adhesion of the ink to the facestock layer.

Useful ink primers may be transparent or opaque and the primers may be solvent based or water-based. In one embodiment, the primers are radiation curable (e.g., UV). The ink primer is typically comprised of a lacquer and a diluent. The lacquer is typically comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. An example of a ink primer material that can be used is CLB04275F-Prokote Primer (a product of Sun Chemical Corporation identified as a solvent based primer useful with inks and coatings). The ink primer layer may have a thickness of from about 1 to about 4 microns or from about 1.5 to about 3 microns.

A transparent polymer protective topcoat or overcoat layer may be present in the labels of the invention. In the embodiments illustrated in FIGS. 4 and 8, a transparent topcoat or overcoat layer 15 overlies the print layer 14. The protective topcoat or overcoat layer provide desirable properties to the label before and after the label is affixed to a substrate such as a container. The presence of a transparent topcoat layer over the print layer may, in some embodiments provide additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g, UV), chemically resistant, thermally resistant thereby protecting the label and, particularly the print layer from degradation from such causes. The protective overcoat may also contain anti-static agents, or anti-block agents to provide for easier handling when the labels are being applied to containers at high speeds. The protective topcoat constructions of the labels used in the invention may also be selected to provide labels useful on containers subjected to subsequent liquid processing such as bottle washing/rinsing, filling and pasteurization, or liquid immersion (e.g., ice bath) without displaying adverse consequences such as label lifting or hazing. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 0.5 to about 5 mils, and in one embodiment about 1 to about 3 mils. Examples of the topcoat layers are described in U.S. Pat. No. 6,106,982 which is incorporated herein by reference.

The protective layer may comprise polyolefins, thermoplastic polymers of ethylene and propylene, polyesters, polyurethanes, polyacryls, polymethacryls, vinyl acetate homopolymers, co- or terpolymers, ionomers, and mixtures thereof. Any of the binders described above as being present in the nano-porous layer can be utilized in the protective topcoat layer.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidniethanol); Tinuvin 770 (bis-(2,2,6,6-tetramethyl-4-piperidinyl)-sebacate); and Tinuvin 783. Also useful light stabilizers are the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

The transparent protective layer may contain a metal deactivator. Any metal deactivator useful in making thermoplastic films can be used. These include the hindered phenol metal deactivators. Examples include those available from Ciba Specialty Chemical under the trade designation Irganox 1024. The concentration of the metal deactivator in the thermoplastic film composition is in the range of up to about 1% by weight, and in one embodiment about 0.2% to about 0.5% by weight.

The water-based adhesives which are useful in the present invention could be any of the water-based adhesives known to be useful for labeling of substrates such as glass, plastics, and metal such as adhesives based on starch, casein, synthetic polymers, or blends of starch, casein or synthetic polymers. As mentioned above, these water-based adhesives are generally referred to in the art as "cold glues". When the clear no label look is desired, a water based adhesive is selected which provides a clear dry coating. In one embodiment, the cold glues may comprise polymer emulsions or micro-emulsions such as synthetic emulsions, e.g., an emulsion based on acrylic polymers or vinyl acetate polymers and usually copolymers such as vinyl acetate/ethylene or vinyl acetate/maleic acid. The water based adhesive also may be an emulsion based on a modified natural latex (e.g., styrene-butadiene rubber, neoprene-butadiene rubber, and acrylate-butadiene rubber). These dispersions or emulsions can optionally be modified by the addition of various synthetic and natural resins and additives such as polymers in solution, rosin compounds, rheological agents, etc. which provide specific properties in terms of flow, anchorage, tackiness, speed of drying, water resistance, etc. These water-based emulsion adhesives generally will have solids content of at least 40%. The water-based adhesives is based on casein or dextrin generally have a lower solids content (20 to 30%). These adhesives often are preferred for polymeric labels and containers made of glass, plastics, and metal. The drying process is assisted when the emulsions contain higher solids contents such as at least 50% and, especially around 60%. Solids content generally does not exceed 65 or 70% by weight.

Some water-based adhesives useful in this invention are described in U.S. Pat. Nos. 3,939,108; 4,336,166; and 4,464,202. The disclosures of water-based adhesives contained in these patents is hereby incorporated by reference. Water-based adhesives useful in the present invention also are available commercially. For example, Findley 242 361M, a casein based labeling adhesive for glass; and Henkel BL300, a starch and styrene-maleic anhydride based adhesive for brewery applications are useful adhesives. The water-based adhesive generally is applied to the nano-porous layer of the label just prior to application of the label to the substrate (e.g., glass bottle). The adhesive is not dried until the label has been applied to the substrate.

The amount of water-based adhesive which is applied to the lower surface of the nano-porous layer may range from about 10 to about 60 g/m$^2$ for 100% coverage of the nano-porous layer. If a grid or other pattern of adhesive is employed, that is, the adhesive layer is not a continuous layer, then the amount of adhesive may be reduced.

The labels of the present invention are useful for labeling of plastic, glass or metal containers or surfaces. The process generally is one wherein the labels (without adhesive) are provided as a stack in a label magazine. A rotating pallet removes adhesive from a rotating adhesive cylinder and applies the adhesive to the nano-porous layer of the top label in the stack. The label is then transferred to a label transfer drum, on which it is held by means such as vacuum suction and/or grippers. From the transfer drum, the label is applied on its adhesive side to the container. In one embodiment, the adhesive is normally applied to the label at ambient temperature, namely, from about 20 to 30° C.

As noted, conventional labeling systems use a pallet to transfer adhesive from the adhesive cylinder to the label. In conventional systems, the surface of this pallet usually consists of very fine shallow grooves which are continuous across the width. These are designed by the machine builder to aid adhesive pickup. This results in adhesive coverage of at least 75 or 80%, often about 100%. Alternatively, it is possible to provide pallets having a surface configuration chosen in accordance with a pattern of adhesive which is applied to the label. In another embodiment, the pallet has a smooth surface for depositing a smooth surface coating of adhesive. These pallets may be made of conventional materials.

The labels of the present invention may be adhesively applied to a variety of substrates including metal, glass and plastic. In one embodiment, the substrates may be containers for food, drink, or a household product, and these containers may be made of glass, plastic or metal. When it is desired to view the contents of a glass or plastic container through the label, a clear or transparent label is used. Such labels provide the container with the clear "no-label look".

When the labels of the present invention are applied to the substrates as described above with water based adhesives as discusses herein, excellent initial adhesion of the label to the substrate is observed. In some applications, such as when applied to beer bottles, the dried labels must be able to survive being immersed in ice water for from one to three days. After being subjected to the ice water test, the labels should remain bonded to the bottle and should not slide when pressure is applied to the label.

The following are examples of labels prepared in accordance with the present invention, and the application of the labels to glass bottles.

Example A

A commercially available 2 mil clear PET film, corona discharge treated on the face side and flame treated on the back side, is coated on the back side with the product of Example 1 using a Bulnose lab drawdown. The coated PET is dried at (170° F.) for 10 minutes to provide a dry coating weight of about 20 g/m$^2$. The opacity of the nano-porous coating is 2.1% measured by a Hunter Color Meter. The coated film is die cut into labels.

A thin layer of Henkel non-casein glue is applied to the exposed surface of the nano-porous layer of the labels using a Burd Bar with a 2 mil gap. The labels are laid against a rubber pad and thereafter applied to glass bottles by rolling the bottles over.

When the above labels are dispensed with a labeling machine onto glass beer bottles using the water based adhesive, excellent initial adhesion of the label to the bottle is observed. After drying at room temperature for 7 days, the labeled bottles are immersed into ice water, and after 3 days in the ice water, the labels remain bonded to the bottles. Also, there is no sliding of the label when pressure is applied to the label.

Example B

The procedure of Example A is repeated except that the PET is replaced by a 2 mile clear polypropylene film which has been topcoated with an acrylic resin. This film is available from Exxon under the designation 50LL534.

Example C

The procedure of Example A is repeated except that the clear PET is replaced by a 2 mil clear polypropylene film which has been flame treated on the back side and corona treated on the front side. This film is available from Amtopp under the designation TP50B.

Examples D–AK

The general procedure of Example A for preparing coated film is repeated except that the coating compositions are the compositions of Examples 2–35, and the film substrate is PET. The coating weights and the opacity of the coatings are reported in the following Table.

TABLE

Nono-Porous Coating on PET

| Example | Coating of Example | Coating Weight (gsm) | Opacity (%) of Coated Film |
|---|---|---|---|
| D | 2 | 20 | 4.0 |
| E | 3 | 20 | 5.2 |
| F | 4 | 20 | 8.3 |
| G | 5 | 20 | 7.3 |
| H | 6 | 20 | 3.4 |
| I | 7 | 20 | 2.1 |
| J | 8 | 20 | 1.5 |
| K | 9 | 20 | 1.8 |
| L | 10 | 20 | 2.8 |
| M | 11 | 20 | 2.1 |
| N | 12 | 20 | 1.0 |
| O | 13 | 20 | 0.4 |

TABLE-continued

Nono-Porous Coating on PET

| Example | Coating of Example | Coating Weight (gsm) | Opacity (%) of Coated Film |
|---|---|---|---|
| P | 14 | 20 | 0.6 |
| Q | 15 | 20 | 0.6 |
| R | 16 | 20 | 0.9 |
| S | 17 | 20 | 1.3 |
| T | 18 | 20 | 0.4 |
| U | 19 | 20 | 0.2 |
| V | 20 | 8.0 | 0.8 |
| W | 21 | 7.2 | 2.1 |
| X | 22 | 6.0 | 4.5 |
| Y | 23 | 7.0 | 5.6 |
| Z | 24 | 5.8 | 1.4 |
| AA | 25 | 3.6 | 3.7 |
| AB | 26 | 5.4 | 5.5 |
| AC | 27 | 20.0 | 37.4 |
| AD | 28 | 20.0 | 16.5 |
| AE | 29 | 12.0 | 3.6 |
| AF | 30 | 5.0 | 4.2 |
| AG | 31 | 8.4 | 4.9 |
| AH | 32 | 4.0 | 13.3 |
| AI | 33 | 7.4 | 2.1 |
| AJ | 34 | 4.0 | 3.8 |
| AK | 35 | 5.0 | 15.9 |

Example AL

A commercially available 2 mil BOPP film, corona discharge treated on the face surface and flame treated on the back surface, is slot die coated with the product of Example 1 on the back surface of the BOPP film to provide a dry coating weight of about 13 g/m². Alumina is vapor deposited on the face surface of the film at a coating weight of about 2.2–2.4 g/m². The exposed surface of the aluminum coating is printed; and the printed surface is then coated with an antistatic composition from Keystone Aniline Co. available under the designation. KeyStat Clear. The functional component of the antistatic composition is believed to be a polyurethane dissolved in acetates. The antistatic composition is applied at a rate of about 0.6 mils wet application to provide a dry weight of 14.65 g/m². The label is applied to glass bottles using available cold glue.

While the invention has been explained in relation to its various embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A label comprising:
(A) a polymer facestock having an upper surface and a lower surface,
(B) a nano-porous layer having an upper surface and a lower surface wherein the upper surface of the nano-porous layer underlies the facestock, and the nano-porous layer contains pores having an average diameter of from about 1 to about 100 nm and has a pore volume of from about 0.1 to about 2 ml./g., and
(C) a metal layer overlying the upper surface of the facestock or underlying the facestock between the facestock and the nano-porous layer, said metal layer having an upper surface and a lower surface.

2. The label of claim 1 wherein the pore volume of the nano-porous layer is from about 0.1 to about 1.2 ml/g.

3. The label of claim 1 wherein the metal of the metal layer is selected from the group of tin, chromium, nickel, stainless steel, copper, aluminum, indium, gold, silver, and alloys thereof.

4. The label of claim 1 wherein the metal is aluminum.

5. The label of claim 1 further comprising an adhesion promoting layer between the upper surface of the facestook and the metal layer.

6. The label of claim 1 also comprising (D) a water-based adhesive in contact with the lower surface of the nano-porous layer.

7. The label of claim 6 wherein the water-based adhesive is based on starch.

8. The label of claim 6 wherein the water-based adhesive is based on casein.

9. The label of claim 6 wherein the water-based adhesive is based on synthetic polymers.

10. A label comprising:
(A) a polymer facestock having an upper surface and a lower surface,
(B) a nano-porous layer underlying the facestock and having an upper surface and a lower surface, wherein the nano-porous layer comprises a binder and nano-sized inorganic particles, and the nano-porous layer contains pores having an average diameter of from about 1 to about 100 nm and the layer has a pore volume of from about 0.1 to about 2 ml./g., and
(C) a metal layer overlying the upper surface of the facestock, said metal layer having an upper surface and a lower surface.

11. The label of claim 10 wherein the pore volume of the nano-porous layer is from about 0.1 to about 1.2 ml/g.

12. The label of claim 10 wherein the nano-porous layer mixture is prepared by mixing a binder with inorganic particles having an average primary particle diameter of from about 5 to about 100 nm.

13. The label of claim 10 wherein the mixture is prepared by mixing a binder with inorganic particles having an average primary particle diameter of from about 5 to about 40 nm.

14. The label of claim 10 wherein the nano-porous layer contains from about 70% to about 95% by weight of the inorganic particles.

15. The label of claim 10 wherein the thickness of the nano-porous layer is from about 5 to about 30 microns.

16. The label of claim 10 wherein the inorganic particles include colloidal silica.

17. The label of claim 10 wherein the binder comprises at least one resin selected from polyurethanes, polyolefins, polyacryls, polymethacryls, polyamides rubbers, polyvinyl acetates, polyvinyl alcohols, polyvinyl ethers, polyacrylonitriles, polystyrenes, polyvinyl pyrrolidones, polyvinyl chlorides, poly (alkylene oxides), proteins, cellulosic polymers, gelatin, and copolymers of one or more monomers including olefins, (meth)acrylates, vinyl acetates, allyl acetates, vinyl chlorides, acrylonitriles, N-vinyl pyrrolidones, N-vinyl oxazolidones, vinyl ethers and other allylic and vinylic monomers.

18. The label of claim 10 wherein the upper surface of the polymer facestock is corona treated or flame treated.

19. The label of claim 10 further comprising an adhesion promoting layer between the lower surface of the facestock and the upper surface of the nano-porous layer.

20. The label of claim 10 further comprising an adhesion promoting layer between the upper surface of the facestock and the lower surface of the metal layer.

21. The label of claim 10 also comprising a print layer overlying the upper surface of the metal layer.

22. The label of claim 21 further comprising a transparent protective layer overlying the print layer, said protective layer comprising a polymer, and said protective layer having anti-static properties.

23. The label of claim 21 further comprising a transparent abrasion, chemical, and/or ultraviolet resistant layer overlying the print layer.

24. The label of claim 21 further comprising an adhesion promoting layer between the upper surface of the metal layer and the print layer.

25. The label of claim 10 also comprising (D) a water-based adhesive in contact with the lower surface of the nano-porous layer.

26. The label of claim 25 wherein the water based adhesive is based on casein.

27. The label of claim 25 wherein the water based adhesive is based on synthetic polymers.

28. The label of claim 25 wherein the water-based adhesive is based on starch.

29. The label of claim 10 wherein the inorganic particles include colloidal aluminum.

30. The label of claim 10 wherein the inorganic particles include silica aluminum composite sols.

31. The label of claim 10 wherein the inorganic particles include nano-size silica gel.

32. The label of claim 10 wherein the inorganic particles include nano-size titanium oxide.

33. The label of claim 10 wherein the inorganic particles include nano-size calcium carbonates.

* * * * *